(12) United States Patent
Gubbins et al.

(10) Patent No.: US 9,842,612 B2
(45) Date of Patent: Dec. 12, 2017

(54) ON HEAD MICROELECTRONICS FOR WRITE SYNCHRONIZATION

(75) Inventors: Mark Anthony Gubbins, Letterkenny (IE); Robert William Lamberton, Limavady (IE); Robert Edward Weinstein, Berthoud, CO (US); James Joseph Touchton, Boulder, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 1127 days.

(21) Appl. No.: 12/571,959

(22) Filed: Oct. 1, 2009

(65) Prior Publication Data

US 2011/0080670 A1    Apr. 7, 2011

(51) Int. Cl.
| | |
|---|---|
| *G11B 5/09* | (2006.01) |
| *G11B 5/02* | (2006.01) |
| *B82Y 10/00* | (2011.01) |
| *G11B 5/31* | (2006.01) |
| *G11B 5/74* | (2006.01) |
| *G11B 20/10* | (2006.01) |
| *G11B 5/82* | (2006.01) |
| *G11B 5/00* | (2006.01) |

(52) U.S. Cl.
CPC .............. *G11B 5/02* (2013.01); *B82Y 10/00* (2013.01); *G11B 5/3133* (2013.01); *G11B 5/746* (2013.01); *G11B 20/10009* (2013.01); *G11B 20/1024* (2013.01); *G11B 20/10222* (2013.01); *G11B 20/10388* (2013.01); *G11B 20/10425* (2013.01); *G11B 5/82* (2013.01); *G11B 2005/0005* (2013.01); *G11B 2220/252* (2013.01)

(58) Field of Classification Search
CPC ........................................................ G11B 5/02
USPC ............................................................. 360/51
See application file for complete search history.

(56) References Cited

U.S. PATENT DOCUMENTS

| | | | | |
|---|---|---|---|---|
| 5,528,819 | A * | 6/1996 | McKay et al. | 29/603.07 |
| 6,202,288 | B1 * | 3/2001 | Shiraishi et al. | 29/603.03 |
| 6,268,980 | B1 * | 7/2001 | Shiraishi et al. | 360/234.5 |
| 6,282,062 | B1 * | 8/2001 | Shiraishi | 360/244.1 |

(Continued)

FOREIGN PATENT DOCUMENTS

| | | |
|---|---|---|
| CN | 102034488 A | 4/2011 |
| JP | 2001-028104 A | 1/2001 |

(Continued)

*Primary Examiner* — Jason Olson
(74) *Attorney, Agent, or Firm* — Holzer Patel Drennan

(57) ABSTRACT

The presently disclosed technology teaches integrating disc drive electronics into a transducer head. Decreased electrical transit times and data processing times can be achieved by placing the electronics on or within the transducer head because electrical connections may be made physically shorter than in conventional systems. The electronics may include one or more of a control system circuit, a write driver, and/or a data buffer. The control system circuit generates a modified clock signal that has a fixed relation to phase and frequency of a bit-detected reference signal that corresponds to positions of patterned bits on the disc. The write driver writes outgoing data bits received from an external connection to off-head electronics directly to the writer synchronized with the modified clock signal. The data buffer stores and converts digital data bits sent from the off-head electronics to an analog signal that is synchronized with the modified clock signal.

21 Claims, 8 Drawing Sheets

(56) References Cited

U.S. PATENT DOCUMENTS

| | | | |
|---|---|---|---|
| 6,738,207 B1* | 5/2004 | Belser et al. ................... | 360/31 |
| 6,754,017 B2* | 6/2004 | Rettner ................. | G11B 5/012 |
| | | | 360/31 |
| 6,970,326 B2* | 11/2005 | Watanabe .................. | 360/244.1 |
| 7,133,229 B2* | 11/2006 | Semba ........................... | 360/51 |
| 7,298,597 B2* | 11/2007 | Carey et al. ............... | 360/324.2 |
| 7,450,342 B2* | 11/2008 | White et al. ............... | 360/234.5 |
| 7,675,703 B2* | 3/2010 | Albrecht et al. ................ | 360/51 |
| 7,880,991 B2* | 2/2011 | Tang .............................. | 360/51 |
| 8,194,508 B2* | 6/2012 | Johnston ............... | B82Y 10/00 |
| | | | 369/13.01 |
| 2001/0030836 A1* | 10/2001 | Katsumata ................. | 360/244.1 |
| 2002/0034050 A1* | 3/2002 | Fujiwara et al. .......... | 360/244.1 |
| 2003/0099065 A1* | 5/2003 | Watanabe .................. | 360/244.1 |
| 2010/0091618 A1* | 4/2010 | Schabes ................ | B82Y 10/00 |
| | | | 369/13.02 |
| 2010/0246048 A1* | 9/2010 | Ranmuthu ...................... | 360/68 |

FOREIGN PATENT DOCUMENTS

| | | |
|---|---|---|
| JP | 2006-086508 A | 3/2006 |
| JP | 2009-016025 A2 | 1/2009 |
| JP | 2009-1740064 A2 | 7/2009 |
| JP | 2011-076705 A | 4/2011 |

* cited by examiner

ON HEAD MICROELECTRONICS FOR WRITE SYNCHRONIZATION

BACKGROUND

During a write to a receiving media by a transducer head, the transducer head uses a magnetic read sensor to read up-track of the writing location to assure the desired data track is targeted during the write operation. As media areal or bit density increases, maintaining a consistent track between the read sensor and a writing pole on the transducer head becomes increasingly difficult.

Additionally, in the continuing effort to increase areal density, media with arrays or patterned cells have been designed where each cell can hold a bit of data (bit patterned media (BPM)). On such BPM, data may be stored in individual cells along a data track defined by the patterned bits. However, each patterned bit is temporally synchronized with each data bit. Otherwise, data insertion may occur on an incorrect patterned bit or a patterned bit may be skipped for data writing. Therefore, one of the challenges with BPM is placing the head over the bit of interest accurately during writing. This is especially challenging due to the small size of the patterned bits (e.g. 1 nano-meter wide) and timing control requirements in a disc system rotating at high speeds (e.g. 20-50 pico-seconds per rotation). Other media forms exhibit similar challenges.

SUMMARY

The presently disclosed technology teaches a method of recording data to bit locations on a storage media. A transducer head is provided that includes on-head control system circuitry. A clock signal is synchronized with a bit-detected reference signal using the on-head control system circuitry to generate a modified clock signal that is synchronized with the bit locations on the storage media. Data received from off-head electronics is then recorded to the bit locations on the storage media using the modified clock signal.

In another implementation, the presently disclosed technology teaches a transducer head with an on-head bit detector configured to detect a reference signal corresponding to bit locations on a storage media. The transducer head also includes an on-head control system circuit configured to synchronize a clock signal with the bit-detected reference signal to generate a modified clock signal that is synchronized with the bit locations. The transducer head also includes an on-head writer configured to record data received from off-head electronics to the bit locations on the storage media.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTIONS OF THE DRAWINGS

The described technology is best understood from the following Detailed Description describing various implementations read in connection with the accompanying drawings.

DETAILED DESCRIPTIONS

In magnetic storage media, a magnetic recording layer includes a thin film of a magnetic alloy that forms random nanometer-scale grains that behave as independent magnetic elements. Each written hit is made up of many of these random grains. In bit patterned media (BPM), the magnetic layer is pre-patterned with an ordered array of patterned bits, each patterned bit capable of storing an individual data bit. The BPM may be pre-patterned through various procedures such as, but not limited to, lithography, ion-milling, etc. Other storage media types exist, including digital recording tape and floppy disks. The presently disclosed technology may be applicable to the various magnetic media storage types.

The time between bit detection using a read sensor and/or a bit detector and bit writing is critical in the correct writing of data to bit location on a media (e.g., a disc drive). Present magnetic recording systems typically require detected data to be sent from a transducer head to processing electronics located elsewhere in a media drive assembly via long electronic lines. Further, power used to write data to the media is sent from the processing electronics via the long electric lines back to the transducer head. The time required and errors involved in sending data from the transducer head to the off-head processing electronics and back to the transducer head is significant when compared to a phase coherence of BPM writing.

According to the presently disclosed technology, electronics that are positioned off-head in the current state of the art are integrated into the transducer head to improve synchronization of data writing with patterned bit locations on the media. Decreased electrical transit times and data processing times can be achieved by placing the electronics on or within the transducer head because electrical connections between the processing electronics and the read sensor(s), bit detector(s), and/or writer (also located one the transducer head) may be made physically shorter than in conventional systems. Physically shorter electrical connections between electronic components can decrease electrical transit times and data processing times by providing a shorter path for electrons to flow between the electronic components.

Figure 1:
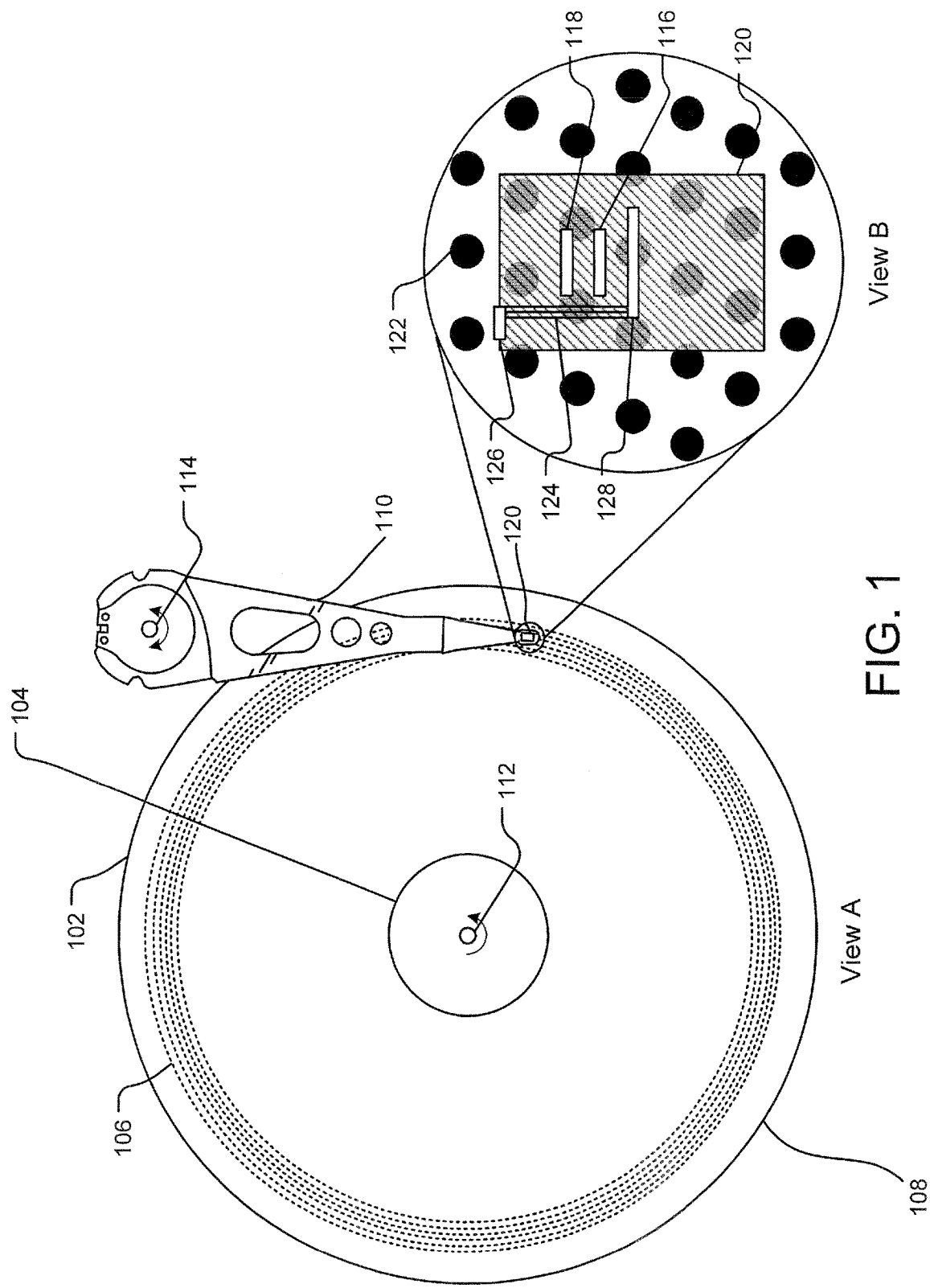
FIG. 1 illustrates a plan view of an implementation of BPM on a media with a transducer head situated on an end of an actuator assembly.

FIG. 1 illustrates a plan view of an implementation of BPM on a media 108 with a transducer head 120 situated on an end of an actuator assembly 110. Referring specifically to View A, media 108 rotates about a media axis of rotation 112 during operation. Further, media 108 includes an outer diameter 102 and inner diameter 104 between which are a number of data tracks 106, illustrated by circular dotted lines. Data tracks 106 are substantially circular and are made up of regularly spaced patterned bits 122.

Information may be written to and read from the patterned bits 122 on the media 108 through the use of the actuator assembly 110, which rotates during a data track 106 seek operation about an actuator axis of rotation 114 positioned adjacent the media 108. A transducer head 120 mounted on the actuator assembly 110 at an end distal the actuator axis of rotation 114 flies in close proximity above the surface of the media 108 during media operation.

In one implementation, the transducer head 120 as detailed in View B utilizes a read sensor 116 to perform a read-before-write process to maintain a transducer head 120 position over a desired data track 106. The read-before-write process is performed by reading magnetic signals from grains on the media 108 and determining a location of a writer 118 with respect to the desired data track 106 from the detected data.

In another implementation, transducer head 120 includes one or more bit detectors, which will be discussed in more detail with respect to FIGS. 2-6. A bit detector in lieu of or in addition to the read sensor 116 offers improved accuracy and speed in determining a location of the writer 118 from a waveform reflected from the patterned bits 122 to the transducer head 120.

In yet another implementation, transducer head 120 includes one or more electrical wires containing spin-polarized currents which will be discussed in more detail with respect to FIG. 2. A spin angular momentum sensor in lieu of or in addition to the read sensor 116 offers improved accuracy and speed in determining a location of the writer 118 by detecting changes in spin properties of the one or more spin-polarized currents when the electrical wires pass in close proximity to the patterned bits 122.

The transducer head 120 is shown in greater detail in View B of FIG. 1. Transducer head 120 is shown with the read sensor 116, the writer 118, on-head microelectronics 128, bond pads 126, and data signal wires 124 electrically connecting the on-head microelectronics 128 to the bond pads 126. The read sensor 116 is configured to read data from the patterned bits 122 on the media 108 and the writer 118 is configured to write data to the patterned bits 122 on the media 108.

Referencing FIG. 1, data to be written to the patterned bits 122 is sent from the off-head electronics to bond pads 126 attached to the exterior of the transducer head 120. The data is then sent to the on-head microelectronics 128 via the data signal wires 124 within the transducer head 120. In some implementations, timing data from the read sensor(s) is sent to the on-head microelectronics 128 for processing. Then the processed timing data may then continue to other on-head components or be sent to the bond pads 126 via the data signal wires 124. The off-head electronics may then read the processed timing data from the bond pads 126. In still further implementations, data read from the media may be transmitted directly to the bond pads 126 and then the off-head electronics without any connection to the on-head microelectronics 128.

Figure 2:
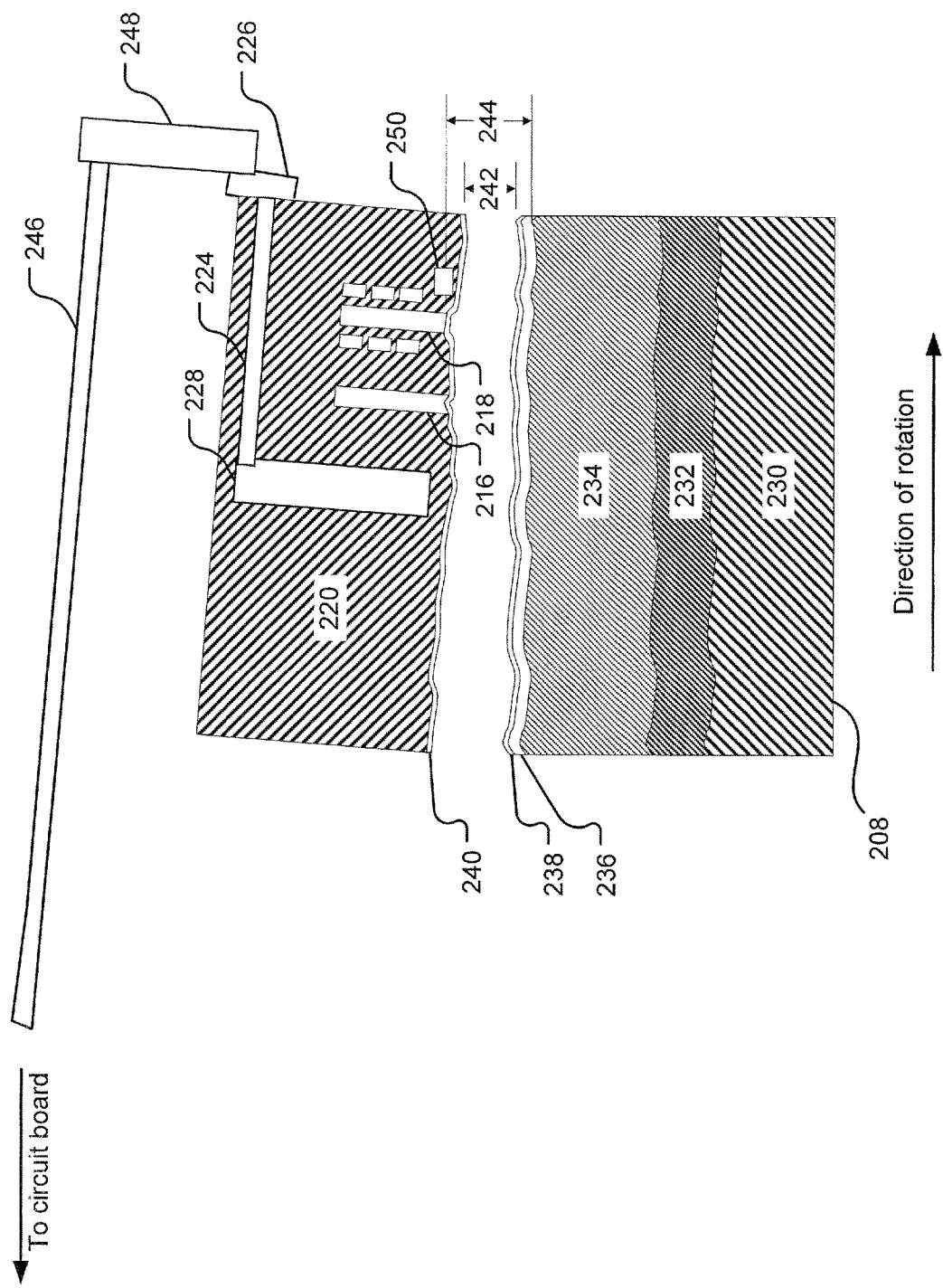
FIG. 2 is a cross sectional view illustrating microelectronics integrated in an example transducer head positioned relative to a media.

FIG. 2 is a cross sectional view illustrating microelectronics integrated in an example transducer head 220 positioned relative to a media 208. Media 208 is made of a substrate material 230 (e.g. aluminum, glass, or ceramic). A thin coating known as an underlayer 232 is deposited on top of the substrate material 230. The underlayer 232 is often deposited by a vacuum deposition process (e.g. magnetron sputtering) and has a layered structure consisting of various metallic alloys arranged to optimize control of a crystallographic orientation and grain size of a magnetic medium 234 positioned on top of the underlayer 232. The magnetic medium 234 is divided into small sub-micrometer sized regions (e.g. groups of grains or patterned bits), each of which is used to represent a single binary bit of information. A media overcoat 236 that protects the magnetic medium 234 from damage is deposited on top of the magnetic medium 234, often using the same vacuum deposition process as the underlayer 232. Finally, a thin polymeric lubricant layer 238 is deposited on top of the media overcoat 236, often by dipping the media 208 is a solvent solution. Even after the media 208 is buffed by various processes to eliminate defects and smooth the media surface, a media roughness facing the transducer head 220 still exists that may be measured with reference to patterned bit size.

Transducer head 220 is made of a substrate material upon which at least a read sensor 216, a writer 218, on-head microelectronics 228, bond pads 226, and data signal wires 224 electrically connecting the on-head microelectronics 228 to the bond pads 226 are mounted. The read sensor 216, writer 218, on-head microelectronics 228, bond pads 226, and data signal wires 224 are mounted within and/or on the surface of the transducer head 220.

In one implementation, the on-head microelectronics 228 includes a control system, a write driver, and a data buffer. In other implementations, the on-head microelectronics 228 includes the control system, write driver, or the data buffer. In still other implementations, the on-head microelectronics 228 includes any two of the control system, write driver, and data buffer. In implementations where the control system, write driver, and/or data buffer are not a part of the on-head microelectronics, the control system, write driver, and/or data buffer are located off-head or not included in the system at all.

In another implementation, the transducer head 220 also incorporates a bit detector 250 configured to detect a waveform generated by an oscillator that is reflected off of a bit of interest on the media 208. The oscillator may be any electronic circuit capable of producing a repetitive electronic signal (e.g. a microwave) and may take the form of a bonded microchip with a delivery system in the form of a wire or a slot line.

In one implementation, the bit detector 250 is any device configured to detect the presence of the reflected waveform. In another implementation, the bit detector 250 is configured to detect wave shape, wave level, amplitude, frequency, wavelength, and/or other properties specific to the reflected waveform. The presence of the reflected waveform and/or various properties of the reflected waveform detected by the bit detector 250 may be used to determine the location of the bit of interest on the media 208.

In another implementation, a spin-polarized current injector is used in lieu of the oscillator and the bit detector 250 is a spin angular momentum sensor 250. Current from the spin-polarized current injector passes through the transducer head 220 via an electrical wire in close proximity to the bit of interest. A magnetic field possessed by the bit of interest interacts with (i.e. transfers spin angular momentum to) the spin-polarized current. The spin angular momentum sensor 250 then detects changes in spin properties of the spin-polarized current.

The spin angular momentum sensor, which can be used as an implementation of a bit detector 250, is a device configured to detect the presence of spin-polarized current. Further, the spin angular momentum sensor 250 may be configured to detect spin magnitude, spin direction, and/or other properties specific to the spin-polarized current. Still further, the spin angular momentum sensor 250 may be configured to detect a frequency of alternating spin species. The presence of spin-polarized current and/or various properties of the spin-polarized current detected by the spin angular momentum sensor may be used to determine the location of the bit of interest on the media 208.

In some implementations, such as the implementation shown in FIG. 2, the bit detector 250 is positioned down-track of the writer 218. In other implementations, the bit detector 250 is positioned up-track of the writer 218. In yet other implementations, there are multiple bit detectors 250 positioned up-track and/or down-track of the writer 218.

Similar to the media 208, the surface of the transducer head 220 facing the media 208 is covered with a head overcoat 240 that protects the read sensor 216, writer 218, and other components of the transducer head 220 from damage. The head overcoat 240 is and is often deposited using the same vacuum deposition process as the media overcoat 236. Further, the surface of transducer head 220 also has a head roughness that may be measured with reference to patterned bit size. The distance between the media overcoat 236 and the head overcoat 240 is referred to herein as clearance 242 and the distance between the bottom of the writer 218 and the top of the magnetic medium 234 is referred to herein as the transducer spacing 244.

In the implementation shown in FIG. 2, the media 208 moves in a left to right fashion (i.e., clockwise when viewed from above) and the on-head microelectronics 228 are oriented vertically and positioned up-track from the read sensor 216 and the writer 218. However, other orientations (e.g. horizontal) and positions (e.g. down track from the read sensor 216 and the writer 218, between the read sensor 216 and the writer 218, or above the read sensor 216 and the writer 218) of the on-head microelectronics 228 are contemplated. Further, the on-head microelectronics 228 may be positioned within the transducer head 220 or mounted on an exterior surface of the transducer head 220. Still further, the on-head microelectronics 228 may have multiple components in different orientations and/or positions.

Positioning of the on-head microelectronics 228 may depend on process and design constraints and the specific application of the presently disclosed technology. For example, implementations that transfer power from the on-head microelectronics 228 to the writer 218 may require the on-head microelectronics 228 to be positioned directly adjacent the writer 218.

Several methods with varying levels of integration exist for joining the on-head microelectronics 228 to the transducer head 220. The highest level of integration may be achieved with thin film processing techniques to directly manufacture the on-head microelectronics 228 in place within the transducer head 220 during the fabrication of the transducer head 220. At the lowest level of integration are techniques which involve separately manufacturing the on-head microelectronics 228 and the transducer head 220 and then joining the on-head microelectronics 228 and the transducer head 220 together.

When fabricated on or within the transducer head 220 using conventional deposition and patterning techniques during the manufacture of the transducer head 220, the on-head microelectronics 228 may take the form of semiconductor devices (e.g. thin film transistors and diodes). Potential materials for the semiconductor devices include, but are not limited to Si, poly-Si, SIGe, GaAs, InP, ZnO, SnO2, and other thin film materials. Multiple semiconductor devices as discussed above may be combined in varying levels of complexity to form the on-head microelectronics 228.

A wider range of microelectronic circuitry (e.g. high performance and sophisticated microprocessors) is available for the on-head microelectronics 228 when the microelectronic circuitry can be bonded to the transducer head 220 after fabrication of the transducer head 220 but before, during, or after the transducer head 220 is processed. Further, standard semiconductor processing techniques may be utilized and all semiconductor substrates (e.g. Si, SOI, GaAs, and InP) are available when the microelectronic circuitry is bonded to the transducer head 220 after fabrication of the transducer head 220.

In a further implementation, individual microelectronic circuits are positioned and bonded to the read sensor(s) 216 and/or writer 218 either during or after fabrication of the transducer head 220. The microelectronic circuits may then be integrated into the transducer head 220 as discussed above.

Wafer-to-wafer bonding may be used to bond fabricated on-head microelectronics 228 to transducer head 220 wafers. Microelectric die(s) associated with the on-head microelectronics 228 may be patterned and integrated into the transducer head 220 using conventional processing techniques. A result is reduced complexity by processing whole wafers rather than individual microelectronic devices and semiconductor devices.

Still referring to FIG. 2, the on-head microelectronics 228 are connected to bond pads 226 located on an exterior surface of the transducer head 220 via data signal wires 224. A conductive flex 246 with end connectors 248 attached to the bond pads 226 allow communication between the on-head microelectronics 228 and electronics located off-head. In various implementations described with more specificity with regard to FIGS. 3 and 4 below, the read sensor 216 and the writer 218 are electrically connected to the on-head microelectronics 228 and/or the off-head electronics.

Figure 3:
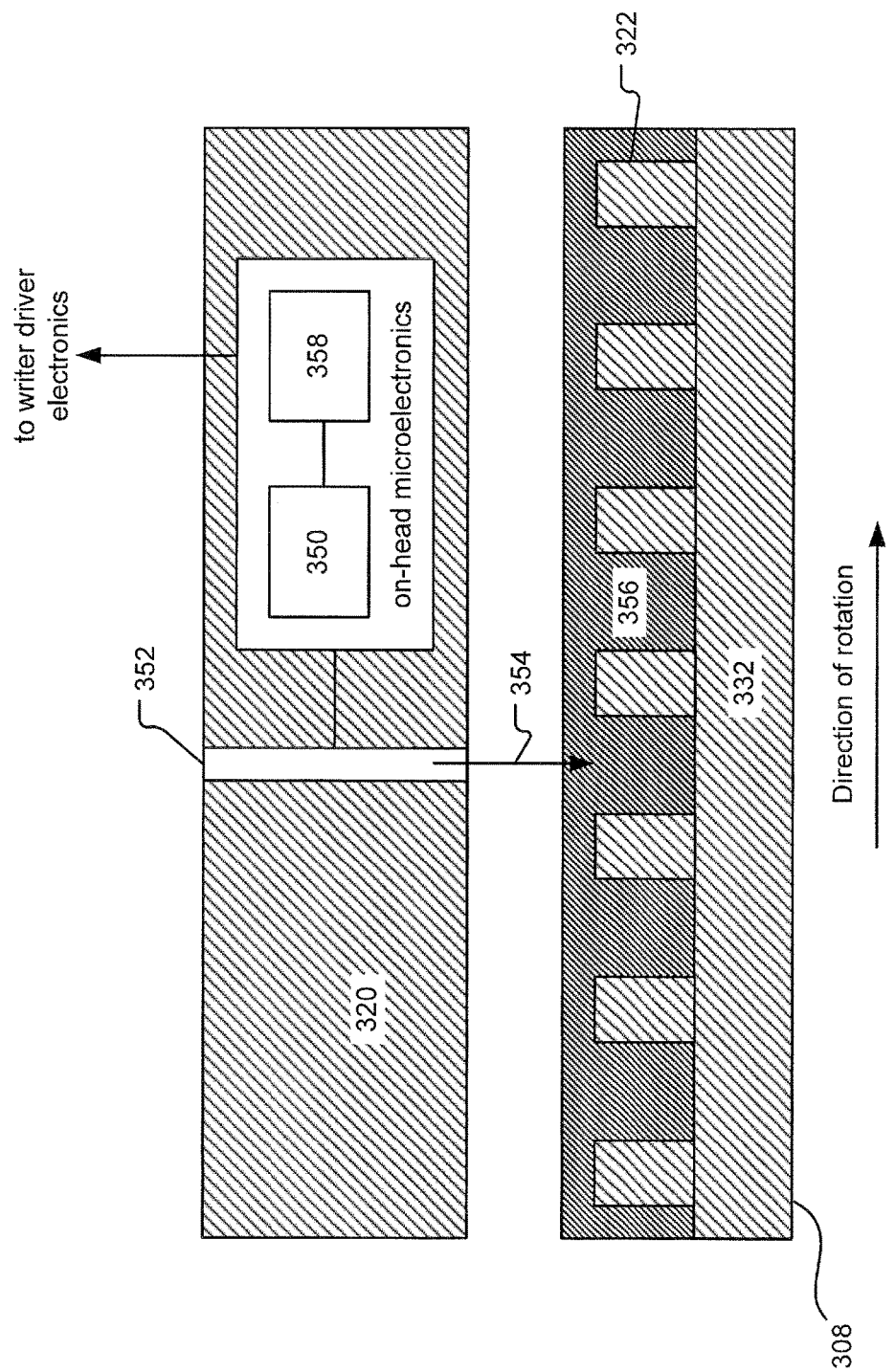
FIG. 3 illustrates an elevation view of an implementation of patterned bits on a media with a transducer head incorporating a metallic electrode, a bit detector, and a preamplifier.

FIG. 3 illustrates an elevation view of an implementation of bit location 322 on a media 308 with a transducer head 320 incorporating a metallic electrode 352, a bit detector 350, and a preamplifier 358. High field or Fowler-Nordheim (F-N) tunneling current 354 is passed under high voltage from the metallic electrode 352 to BPM on the media 308. As the media 308 rotates, the metallic electrode 352 alternates its alignment between orientations adjacent patterned hits 322 and orientations adjacent insulating regions 356. This alternation results in an alternating distance between the metallic electrode 352 and the media (patterned bit 322 or conducting underlayer 332) and therefore a modulating tunneling current 354 corresponding to patterned bit 322 locations.

In the implementation of FIG. 3, the bit detector 350 and preamplifier 358 together comprise the on-head microelectronics. The bit detector 350 detects the modulating tunneling current 354 and generates a timing signal that can be used to determine a frequency of the hit locations 322. In one implementation, the metallic electrode 352 can also be a writer because both the metallic electrode 352 and the writer must be aligned with the patterned bits 322 and pass very close to the media 308 during data bit writing.

F-N field emission is a quantum mechanical process where electrons flow from a material into space under an electric field. Generally, F-N emission creates very small electric current flows typically in the range of $10^{-9}$ to $10^{-12}$ Amps between a transducer head 320 and a media 308. However, the F-N emission may be amplified to create an electric current with a magnitude sufficient to affect the media 308. The amplified F-N emission may cause damage to the transducer head 320 and/or media 308 if too great in magnitude and/or not timed accurately to correspond with bit locations 322 using a timing signal (discussed below).

Since the modulating tunneling current 354 is typically very small in magnitude, the bit detector 350 may be connected to a preamplifier 358 on the transducer head 320 to amplify the signal before transmission to write driver electronics located either on-head or off-head. In one implementation, the output signal voltage from the preamplifier 358 is proportional to the modulating F-N current and the output signal is used as a clock input for phase-locked loop (PLL), delay-locked loop (DLL), or other write driver control schemes. PLL control schemes are discussed in more detail below with regard to FIGS. 5 and 6.

The advantage of the implementation of FIG. 3 as compared with the current state of the art is a stronger electrical signal is transmitted to processing electronics located either on-head or off-head to determine phase requirements for the writer. The result is less error in detection of bit locations 322 and improved synchronization of the writing of data bits to the patterned bits 322.

The voltage applied through the metallic electrode 352 is relatively constant with respect to bit location 322 and inter-bit insulator 356 locations. However, in another implementation, the voltage could be varied to minimize fluctuations in the tunneling current 354 due to outside parameters (e.g. fly height). An automatic gain control (AGC) feedback amplifier may be used to control voltage of the tunneling current 354. Further, the AGC feedback amplifier could be used to indicate head to media clearance, which is important when selecting clearance values in media drive certification as well as during media drive operation under varying environmental conditions.

Figure 4:
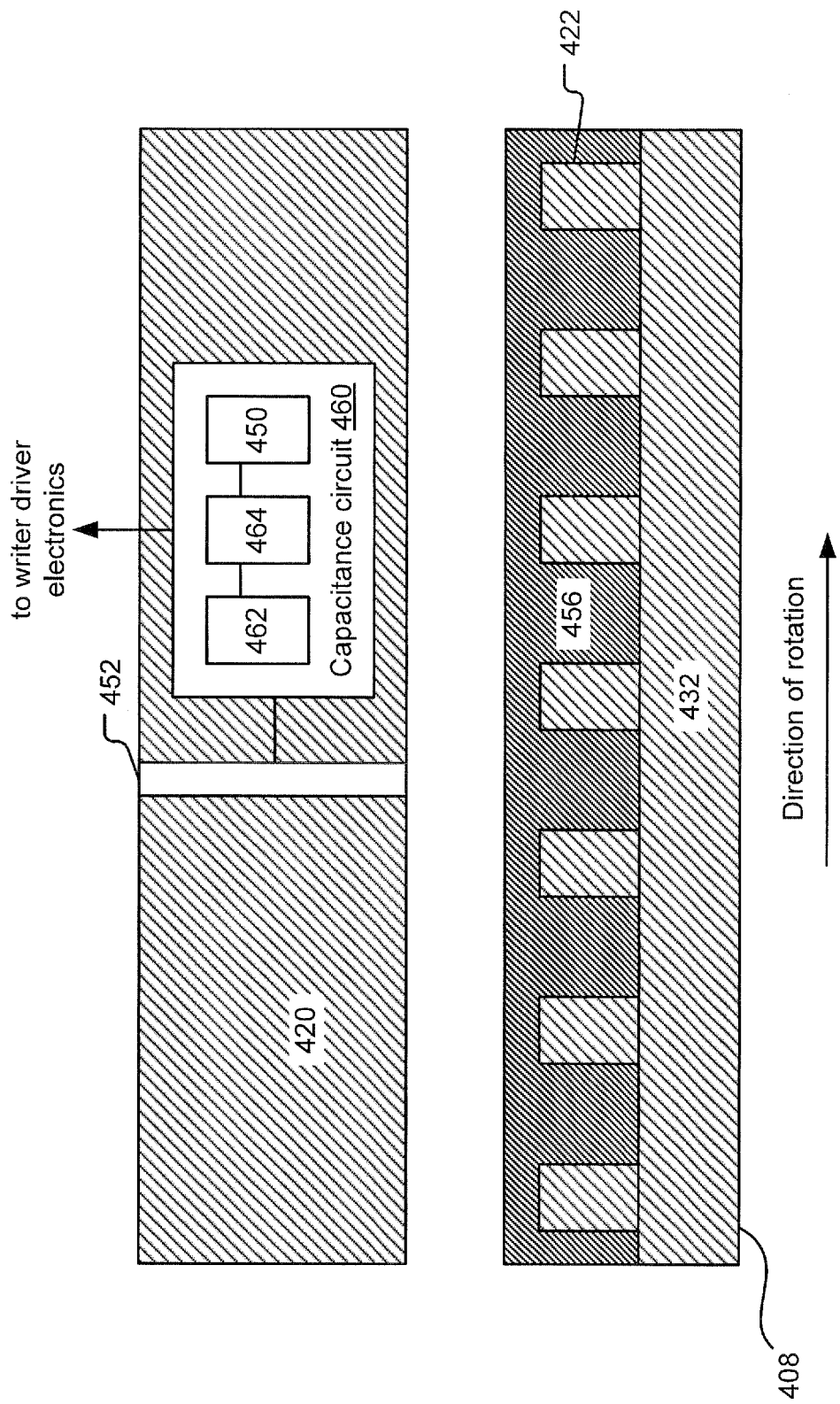
FIG. 4 illustrates an elevation view of another implementation of patterned bits on a media with a transducer head incorporating a metallic electrode and a capacitance circuit.

FIG. 4 illustrates an elevation view of another implementation of bit locations 422 on a media 408 with a transducer head 420 incorporating a metallic electrode 452 and a capacitance circuit 460. Here, the metallic electrode 452 is connected to an alternating current signal generator. A capacitance between the metallic electrode 452 and the media 408 modulates as the metallic electrode 452 alternates from a patterned bit 422 location and an insulating region 456 location. This capacitance modulation can be used to detect patterned bit 422 locations and a timing signal can be generated based on the capacitance modulation.

The capacitance circuit 460 has an oscillator 462, a tunable resonator circuit 464, and a voltage or current sensor 450. The oscillator 462 is connected to the resonator circuit 464 as shown schematically in FIG. 4. When DC power is applied to the oscillator 462, the capacitance circuit 460 resonates at a resonator circuit 464 frequency (e.g., approximately one gigahertz). The resonator circuit 464 is a conducting line coupled to the metallic electrode 452. As the metallic electrode 452 moves from the patterned bit 422 location to the insulating region 456 location, the capacitance between the media 408 and the metallic electrode 452 changes. A resonant frequency of the resonance circuit 464 changes and the amplitude and/or voltage of the current in the resonance circuit 464 is modulated. The modulated current or voltage signal from the resonance circuit 464 is received by the sensor 450 and can then be transmitted to write driver electronics located either on-head or off-head.

An advantage of placing the capacitance circuit 460 on-head is that the signal to noise ratio in the modulated current or voltage is reduced. By making the capacitance circuit 460 physically closer to the bit locations 422, the conducting lines between the capacitance circuit 460 and the bit locations 422 may be made shorter than in an off-head capacitance circuit 460 application. As the distance between the capacitance circuit 460 and the bit locations 422 increases, signal loss in conducting lines and convolution with other microwave effects in the media 408 assembly increases. Therefore, minimizing the distance between the capacitance circuit 460 and the bit locations 422 is desirable.

Figure 5:
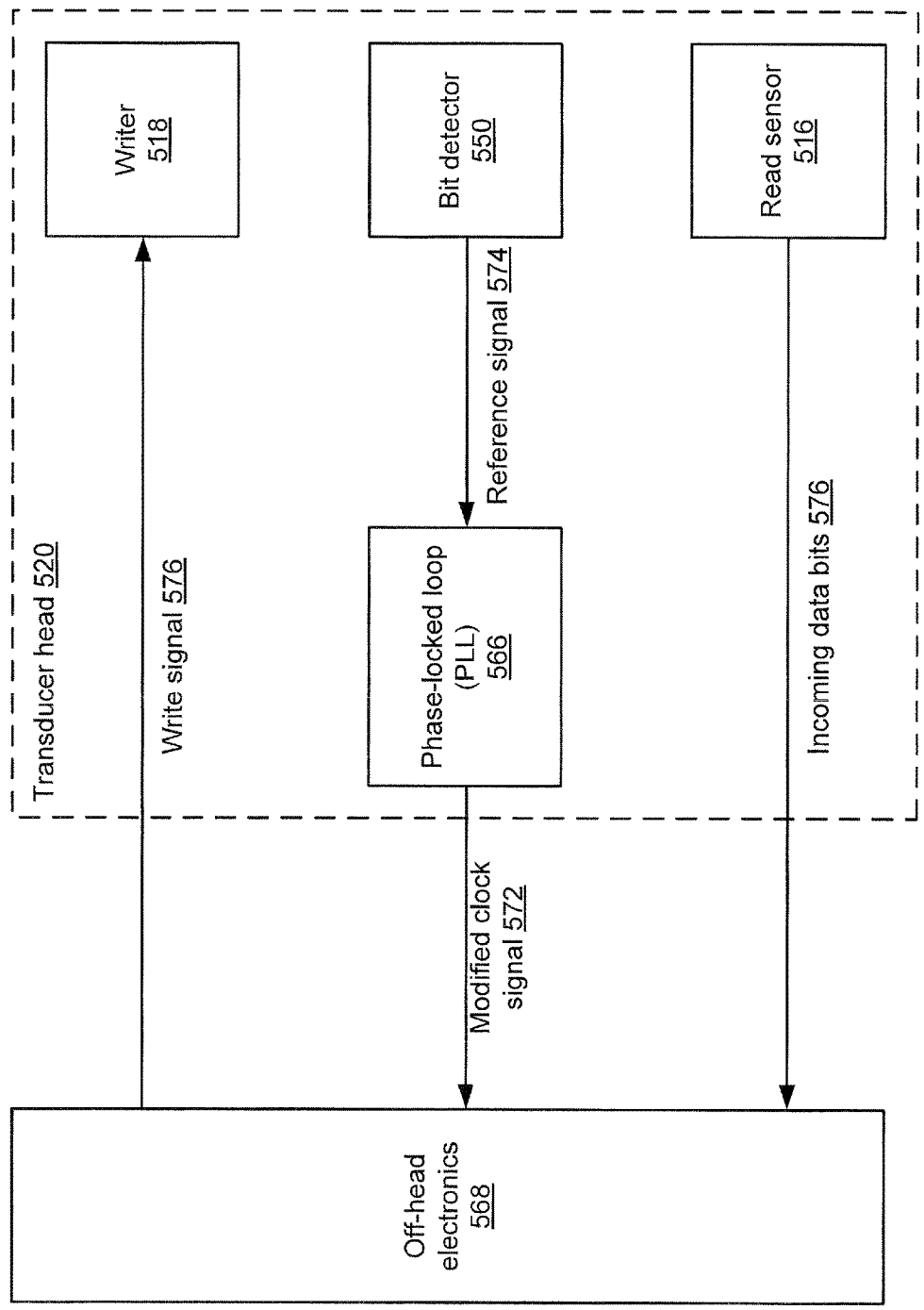
FIG. 5 is a flow diagram illustrating an on-head phase-locked loop (PLL) control scheme.

FIG. 5 is a flow diagram illustrating an on-head phase-locked loop 566 (PLL) control scheme. The PLL 566 is a control system that generates a modified clock signal 572 that has a fixed relation to phase and frequency of a bit-detected reference signal 574. The PLL 566 circuit compares frequency and phase of a clock signal and the bit-detected reference signal 574 and iteratively adjusts the frequency of the clock signal until the frequency and phase of the clock signal matches the frequency and phase of the bit-detected reference signal 574 yielding the modified clock signal 572. Other implementations of the presently disclosed technology may utilize a delay-locked loop (DLL) or other control system in place of PLL 566.

Read sensor 516 directly transmits incoming data bits 576 read off a media to off-head electronics 568. With regard to writing outgoing data bits, the implementation illustrated in FIG. 5 shows the bit-detected reference signal 574 comes from a bit detector 550 (e.g. a waveform sensor, spin angular momentum sensor, tunneling current sensor, or capacitance sensor) on the transducer head 520 that indicates patterned bit timing and the clock signal indicates timing for the writer. The bit-detected reference signal 574 and the clock signal are compared to determine a phase relationship between the clock signal and actual physical positions of patterned bits on a media. The PLL 566 generates a modified clock signal 572 that is phase and frequency synchronized with actual physical positions of the patterned bits.

In one implementation, the PLL 566 has a high frequency oscillator, which generates the clock signal for the intended frequency of writing. The bit-detected reference signal 574 from the bit detector 550 is compared to the clock signal and the phase between the bit-detected reference signal 574 and the clock signal is measured and passed through a low pass filter to generate a DC bias. The DC bias is then applied to the oscillator to change the frequency and phase of the clock signal to synchronize the clock signal with the bit-detected reference signal 574. The synchronized clock signal (i.e. modified clock signal 572) is then sent to off-head electronics 568 in order to generate a write signal 576 that is transmitted to a writer 518 that writes each outgoing data bit to the desired patterned bit on the media.

An advantage of using an on-head PLL 566 is faster detection of the phase difference between the clock signal and the actual frequency of patterned bits passing under the transducer head 520. On the contrary, an off-head PLL requires larger signal transit times resulting in detected phase information that may be outdated by the time PLL processing is completed. Further, in one implementation, on-head PLL 566 enables low frequency bias information to be transmitted to off-head electronics 568 instead of high frequency clock signals, which are more susceptible to signal loss.

Figure 6:
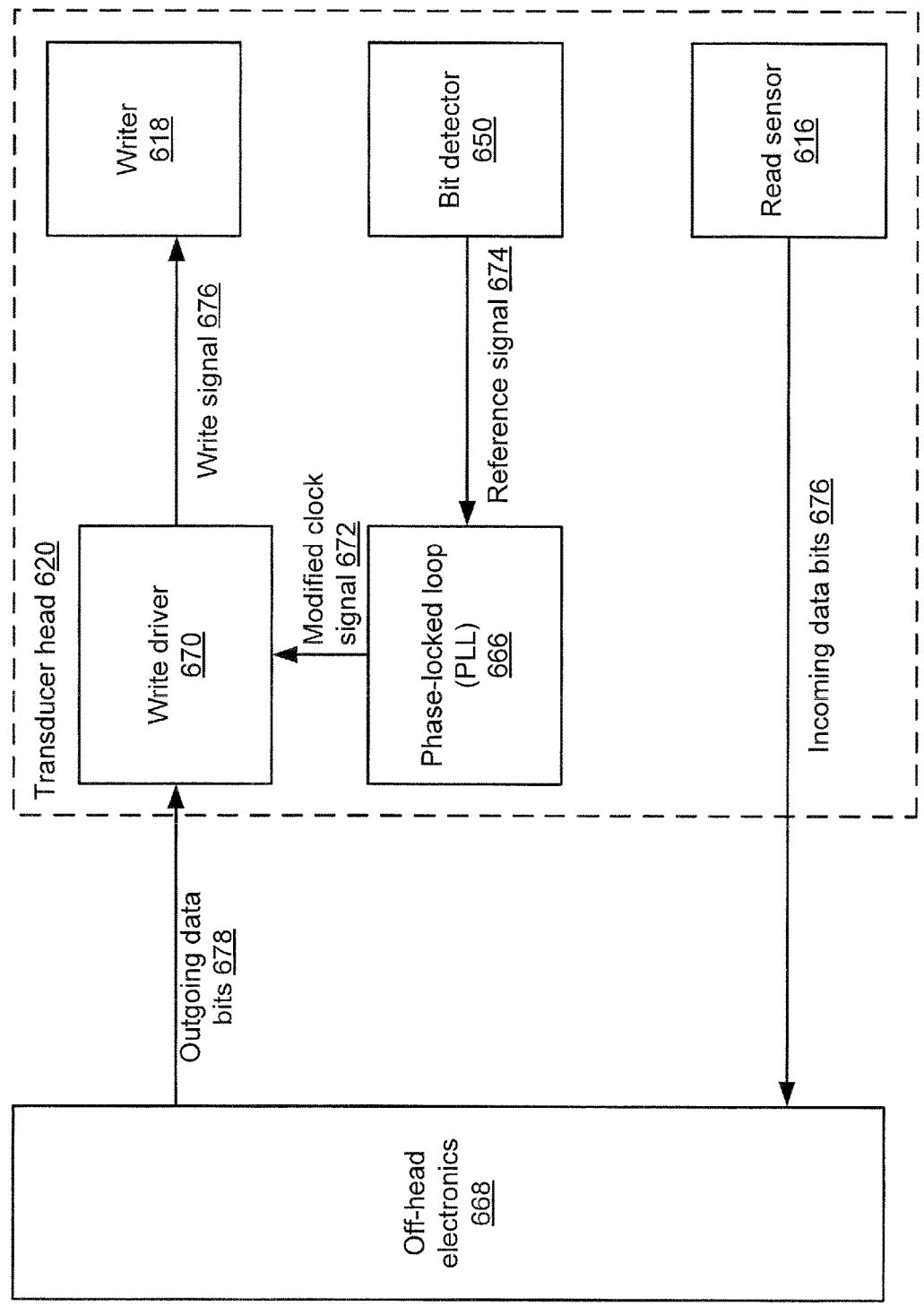
FIG. 6 is a flow diagram illustrating an on-head phase-locked loop (PLL) control scheme with an on-head write driver.

FIG. 6 is a flow diagram illustrating an on-head phase-locked loop 666 (PLL) control scheme with an on-head write driver 670. Similar to FIG. 5, read sensor 616 directly transmits incoming data bits 676 read off a media to off-head electronics 668. With regard to writing outgoing data bits 678, the PLL circuit on the transducer head of FIG. 5 may be combined with a write driver 670 on the transducer head 620 for better write synchronization. The write driver 670 may write outgoing data bits 678 received from an external connection to the off-head electronics 668 directly to the writer 618. The write driver 670 is coupled to the PLL 666 using on-head connections so that the phase information (e.g. modified clock signal 672) is directly transmitted to the write driver 670 enabling the outgoing data bits 678 to be precisely written to patterned bits on a media.

An advantage of using an on-head write driver 670 is that delays and timing errors that occur due to transmission of the modified clock signal 672 to the off-head electronics 668 and transmission of the write signal 676 from the off-head electronics 668 are reduced or eliminated. Further, using the on-head write driver 670 decreases time between phase detection and the writing of data bits, resulting in a reduced likelihood of errors.

The PLL 666 and write driver 670 may be physically positioned anywhere in the transducer head 620. In one implementation, the PLL 666 and write driver 670 are coupled together near the writer 618. In another implementation, the PLL 666 is positioned near the writer 618 and the write driver 670 is positioned closer to a transducer head substrate so that heat generated by the write driver 670 is dissipated through the transducer head substrate. In higher power electronics, this orientation may be desirable.

One implementation of the on-head PLL 666 with on-head write driver 670 also incorporates an on-head data buffer. The combination of the on-head PLL 666, write driver 670, and data buffer is a self contained writer control system where the location and phase of the patterned bits on the media are detected and the next data bit can be quickly written to the correct patterned bit. More specifically, a modified clock signal 672 generated by the PLL 666 is sent to the write driver 670. Digital data bits sent from the off-head electronics 668 to the data buffer are converted to an analog data signal that is synchronized with the modified clock signal 672 and applied to the writer 618 with correct polarity and phase.

An advantage of using an on-head data buffer is reduced time delay in converting digital data bits to an analog data signal and reduced time delay between patterned bit detection and bit writing, resulting in reduced probability of write errors.

Further, the on-head PLL 666, write driver 670, and data buffer may be positioned at any location on the transducer head 620 so long as heat dissipation requirements are met and suitable electrical connections between the PLL 666, write driver 670, and data buffer are possible. In one implementation, the PLL 666, write driver 670, and data buffer are coupled together in one location. In other implementations, the PLL 666, write driver 670, and data buffer are in separate locations on the transducer head 620. In still further implementations, the PLL 666, write driver 670, and/or data buffer may be located off-head so long as at least one of the PLL 666, write driver 670, and data buffer is located on-head.

Figure 7:
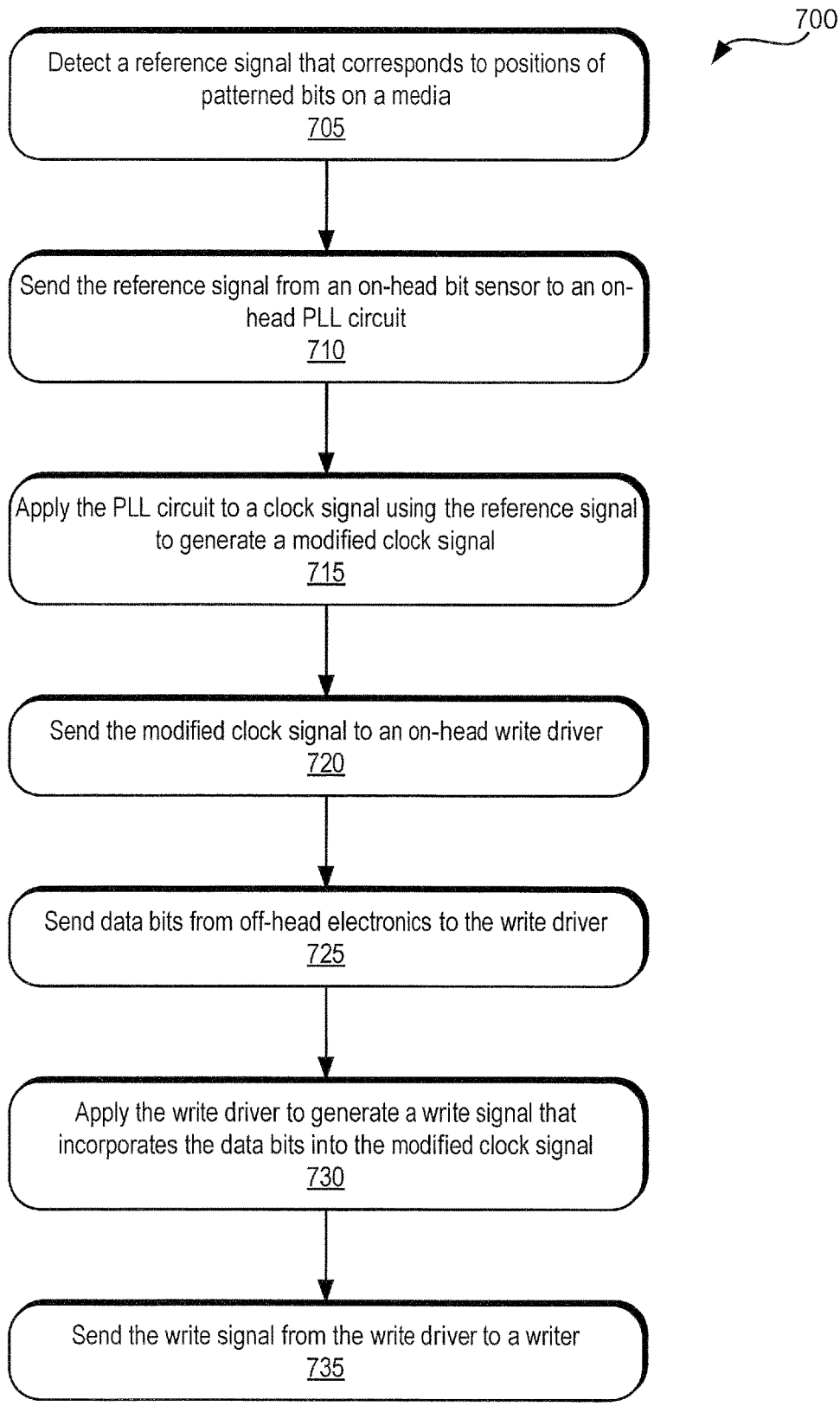
FIG. 7 is a flow chart illustrating operations for using an on-head phase-locked loop and an on-head write driver to synchronize writing of data bits to patterned bits on a media.

FIG. 7 is a flow chart illustrating operations 700 for using an on-head phase-locked loop (PLL) and an on-head write driver to synchronize writing of data bits to patterned bits on a media. A bit detector detects a signal that corresponds to positions of the patterned bits on the media with respect to a writer on a transducer head 705. The detected signal, referred to herein as a bit-detected reference signal, is then sent from the bit detector to an on-head PLL circuit 710. A PLL is then applied to a clock signal corresponding to writer timing and the bit-detected reference signal to generate a modified clock signal that is synchronized with actual positions of the patterned bits on the media 715.

The modified clock signal is then sent to an on-head write driver 720. Further, data bits to be written to the patterned bits on the media are sent from off-head electronics to the on-head write driver 725. The write driver then generates a write signal that incorporates the data bits into the modified clock signal 730. The write signal is then sent from the write driver to a writer that transfers the data bits to the patterned bits on the media 735.

Figure 8:
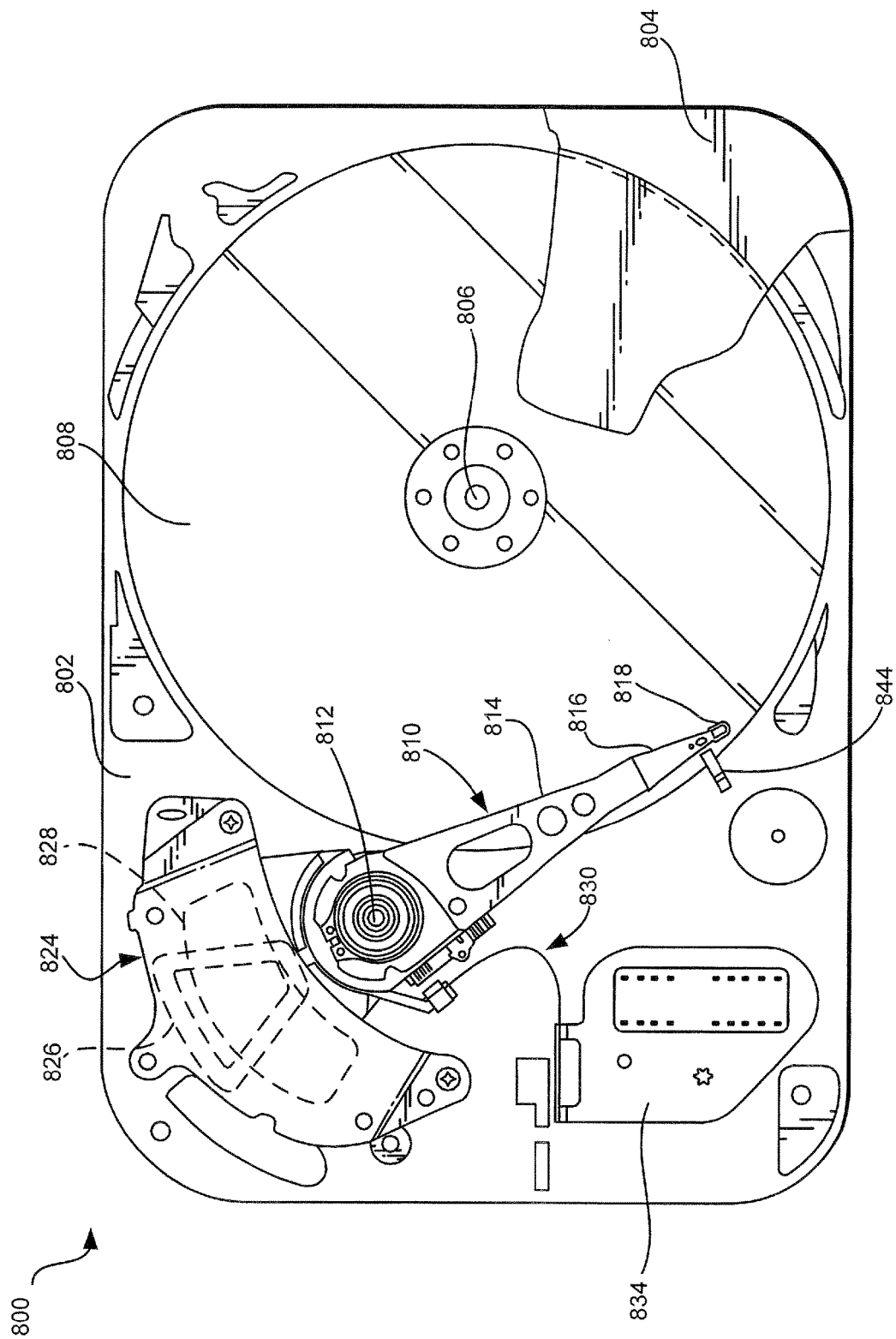
FIG. 8 illustrates a plan view of an example disc drive.

FIG. 8 illustrates a plan view of an example disc drive 800. The disc drive 800 includes a base 802 to which various components of the disc drive 800 are mounted. A top cover 804, shown partially cut away, cooperates with the base 802 to form an internal, sealed environment for the disc drive in a conventional manner. The components include a spindle motor 806 that rotates one or more storage medium discs 808 at a constant high speed. Information is written to and read from tracks on the discs 808 through the use of an actuator assembly 810, which rotates during a seek operation about a bearing shaft assembly 812 positioned adjacent the discs 808. The actuator assembly 810 includes a plurality of actuator arms 814 that extend towards the discs 808, with one or more flexures 816 extending from each of the actuator arms 814. Mounted at the distal end of each of the flexures 816 is a head 818 that includes an air bearing slider enabling the head 818 to fly in close proximity above the corresponding surface of the associated disc 808. The distance between the head 818 and the storage media surface during flight is referred to as the fly height During a seek operation, the track position of the head 818 is controlled through the use of a voice coil motor (VCM) 824, which typically includes a coil 826 attached to the actuator assembly 810, as well as one or more permanent magnets 828 which establish a magnetic field in which the coil 826 is immersed. The controlled application of current to the coil 826 causes magnetic interaction between the permanent magnets 828 and the coil 826 so that the coil 826 moves in accordance with the well-known Lorentz relationship. As the coil 826 moves, the actuator assembly 810 pivots about the bearing shaft assembly 812 and the transducer heads 818 are caused to move across the surfaces of the discs 808.

The spindle motor 806 is typically de-energized when the disc drive 800 is not in use for extended periods of time. The transducer heads 818 are moved away from portions of the disc 808 containing data when the drive motor is de-energized. The transducer heads 818 are secured over portions of the disc 808 not containing data through the use of an actuator latch arrangement and/or ramp assembly 844, which prevents inadvertent rotation of the actuator assembly 810 when the drive discs 808 are not spinning.

A flex assembly 830 provides the requisite electrical connection paths for the actuator assembly 810 while allowing pivotal movement of the actuator assembly 810 during operation. The flex assembly 830 includes a printed circuit board 834 to which a flex cable connected with the actuator assembly 810 and leading to the head 818 is connected. The flex cable may be routed along the actuator arms 814 and the flexures 816 to the transducer heads 818. The printed circuit board 834 typically includes circuitry for controlling the write currents applied to the transducer heads 818 during a write operation and a preamplifier for amplifying read signals generated by the transducer heads 818 during a read operation. The flex assembly 830 terminates at a flex bracket for communication through the base deck 802 to a disc drive printed circuit board (not shown) mounted to the bottom side of the disc drive 800.

In one implementation, a phase-locked loop circuit is mounted on the transducer head 818 and configured to send a modified clock signal to the printed circuit board 834 via flex assembly 830. Further, a writer mounted on the transducer head 818 is configured to receive a write signal from the printed circuit board 834 via flex assembly 830 and transfer data to the disc 808 or any other media. In another implementation, a write driver is mounted on the transducer head 818 and configured to receive outgoing data bits from the printed circuit board 834 via flex assembly 830. The write driver then generates a write signal that is sent to a writer which in turn transfers the outgoing data bits to the disc 808.

The above specification and examples provide a complete description of the structures of exemplary implementations of apparatus that may be used for waveform based bit detection for bit patterned media. Although various implementations of the apparatus have been described above with a certain degree of particularity, or with reference to one or more individual implementations, those skilled in the art could make numerous alterations to the disclosed implementations without departing from the spirit or scope of the presently disclosed technology. It is intended that all matter contained in the above description and shown in the accompanying drawings shall be interpreted as illustrative only of particular implementations and not limiting. The implementations described above and other implementations are within the scope of the following claims.

What is claimed:

1. An apparatus comprising:
an on-head bit detector located on a transducer head and configured to detect a reference signal corresponding to bit locations on a storage media;
on-head control system circuitry integrated within the transducer head and configured to synchronize a clock signal with the bit-detected reference signal to generate a modified clock signal synchronized with the bit locations on a storage device;
an on-head writer configured to record data received from off-head electronics to the bit locations on the storage device using the modified clock signal; and
an on-head write driver configured to generate a write signal incorporating the data into the modified clock signal and send the write signal to the on-head writer.

2. The apparatus of claim 1, wherein the control system circuitry includes a phase-locked loop circuit.

3. The apparatus of claim 1, wherein the data is in a digital signal and a data buffer of the on-head control system circuitry is configured to convert the digital data to an analog data signal that is incorporated into the modified clock signal.

4. The apparatus of claim 1, wherein the modified clock signal is generated by passing a phase difference between the bit-detected reference signal and the clock signal through an on-head low pass filter to generate a DC bias and the DC bias is applied to a high frequency oscillator to change the frequency and phase of the clock signal.

5. A transducer head comprising:
an on-head bit detector located on a transducer head and configured to detect a reference signal corresponding to bit locations on a storage device;
an on-head control system circuit integrated within the transducer head and configured to synchronize a clock signal with the bit-detected reference signal to generate a modified clock signal that is synchronized with the bit locations;
an on-head writer configured to record data received from off-head electronics to the bit locations on the storage device; and
an on-head write driver configured to generate a write signal incorporating the data into the modified clock signal and send the write signal to the on-head writer.

6. The transducer head of claim 4, wherein the control system circuitry includes a phase-locked loop circuit.

7. The transducer head of claim 4, wherein the on-head bit detector includes a waveform sensor.

8. The transducer head of claim 4, wherein the on-head bit detector includes a spin angular momentum sensor.

9. The transducer head of claim 4, wherein the on-head bit detector includes a tunneling current sensor.

10. The transducer head of claim 4, wherein one or more of the on-head bit detector, on-head control system circuit, and the on-head writer are fabricated in place on the transducer head during transducer head manufacturing.

11. The transducer head of claim 4, wherein the modified clock signal is generated by passing a phase difference between the bit-detected reference signal and the clock signal through a low pass filter to generate a DC bias and the DC bias is applied to a high frequency oscillator to change the frequency and phase of the clock signal.

12. A transducer head comprising:
an on-head bit detector located on a transducer head and configured to detect a reference signal corresponding to bit locations on a storage device;
on-head control circuitry integrated within the transducer head and configured to synchronize a clock signal with the bit-detected reference signal to generate a modified clock signal synchronized with the bit locations on a storage device;
an on-head write driver located on the transducer head and configured to generate a write signal synchronizing data received from off-head electronics with the bit locations on the storage device based on the bit-detected reference signal; and
an on-head writer configured to receive the write signal from the on-head write driver and record the data to the bit locations on the storage device.

13. The transducer head of claim 12, wherein the on-head bit detector includes a waveform sensor.

14. The transducer head of claim 12, wherein the on-head bit detector includes a spin angular momentum sensor.

15. The transducer head of claim 12, wherein the on-head bit detector includes a tunneling current sensor.

16. The transducer head of claim 12, wherein one or more of the of the on-head bit detector, on-head write driver, and on-head writer are fabricated in place on the transducer head during transducer head manufacturing.

17. The transducer head of claim 12, wherein the data bits are in a digital signal, further comprising:
a data buffer configured to convert the digital data to an analog data signal; wherein the on-head write driver is further configured to receive the analog data signal from the data buffer and incorporate the analog data signal into the write signal.

18. The apparatus of claim 1, wherein the write driver circuitry is integrated within the transducer head.

19. The transducer head of claim 5, further comprising a read sensor configured to transmit incoming data bits read off the device to off-head electronics.

20. The transducer head of claim 12, wherein the write driver is integrated within the transducer head.

21. The transducer head of claim 1, further comprising a read sensor located on the transducer head separate from the bit detector.

* * * * *